Oct. 9, 1945.　　　　R. H. BLANK　　　　2,386,585
PRESSURE ACTUATED SHUTOFF
Filed Dec. 4, 1943

Rudolph H. Blank INVENTOR.

BY Victor J. Evans & Co.

ATTORNEYS

Patented Oct. 9, 1945

2,386,585

UNITED STATES PATENT OFFICE 2,386,585

PRESSURE ACTUATED SHUTOFF

Rudolph H. Blank, Treadwell, N. Y.

Application December 4, 1943, Serial No. 512,919

13 Claims. (Cl. 137—153)

My invention relates to the distribution of liquids, gases and the like under pressure to a plurality of points or zones from a common source of supply, and has among its objects and advantages the provision of an improved automatic shutoff valve operating to eliminate or cutoff that portion of the circuit in which a leak may occur to prevent complete failure of the entire system by continued loss of the liquid or gas.

An object of my invention is to provide a shutoff valve which is efficiently responsive to variable pressures in branch circuits for cutting off an impaired branch circuit as a function of low pressure in that circuit, in which a movable valve element is employed for cutting off the impaired circuit from the common source of supply, and in which the valve element is so designed as to accommodate unstable conditions of the valve element without influencing any of the circuits until such time as one branch circuit has become impaired.

Figure 1:
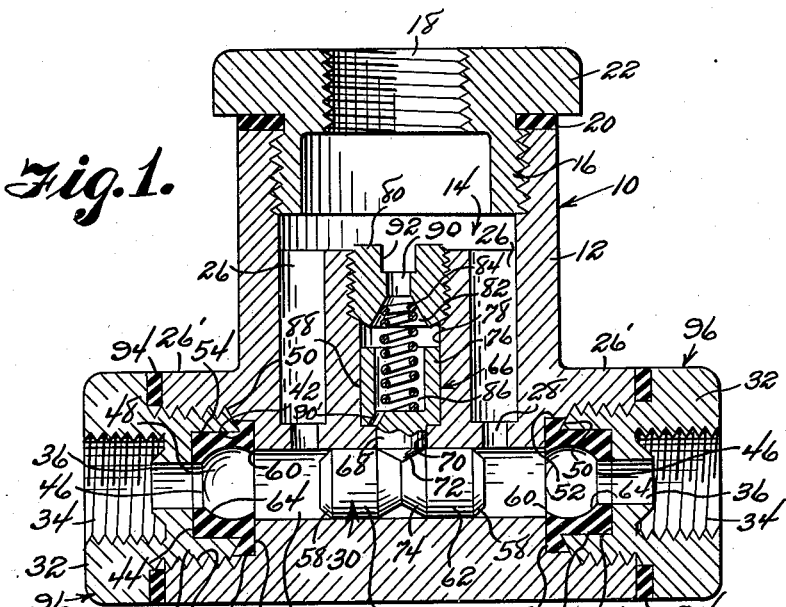
Figure 1 is a sectional view of a shutoff valve in accordance with my invention.

In the embodiment of the invention selected for illustration, I make use of a body 10 of generally T-shaped contour when viewed according to Figure 1. The extension 12 of the body 10 is provided with a bore 14 into which is threaded a nut 16 having a threaded bore 18 for connection with a source of fluid under pressure having communication with the bore 14. A seal 20 is interposed between the end of the extension 12 and the nut flange 22 to provide a pressuretight connection.

The body 10 is provided with a bore 24 arranged at right angles to the axis of the bore 14 and coaxial with the extensions 26' of the body 10. This bore is of uniform diameter and has communication with the bore or reserve chamber 14 through the medium of two diffusing bores 26 and two distributing bores 28. Each bore 26 leads directly into the bore 14 and into one of the distributing bores 28. The bores 26 are of larger diameters than their respective bores 28 and both sets of bores are arranged at right angles to the bores 24, with the bores 28 spaced sufficiently far apart to provide accommodation for a valve element 30 of cylindrical contour and slidably fitted in the bore 24. Figure 1 illustrates the normal position of the valve element 30, at which time both bores 28 are uncovered so that liquid or fluid under pressure may flow from its source to points of distribution through lines connected with nuts 32 at the ends of the respective extensions 26'.

Each nut 32 includes a threaded bore 34 for connection with a distribution line (not shown). The bore 34 is coaxial with the bore 24 and communicates therewith through the medium of a port 36. The nut 32 has a shank 38 threaded into a bore 40 in its respective extension 26'. An axial bore 42 is provided in the shank 38 for the reception of a resilient body 44. This body is provided with a port 46 coaxial with the bore 36, in addition to a cavity 48 having communication with the bore 24. A tapered end 50 is provided on the shank 38 to engage underneath an angled and annular lip 52 on the body 44. One end of the body 44 is pressed against the bottom face 54 of the bore 42 and its other end is pressed against an annular shoulder 56 on the body 10.

The body 44 preferably comprises rubber, and the end 50 engages underneath the lip 52 to restrain the body from collapsing inwardly of its cavity 48. This cavity is of generally spherical contour. Both ends of the valve element 30 are provided with tapered valve faces 58 for coaction with the respective bodies 44. Each body 44 includes an annular lip 60 of smaller diameter than the bore 24 so as to firmly embrace the annular face 62 on its end of the valve element 30 to establish a preliminary seal as the valve element 30 is moved longitudinally of the bore 24 when an unbalanced pressure condition is established in the bore. Each body 44 includes a seat 64 against which one tapered end 58 is adapted to seat when the valve element 30 is moved its full distance in the direction of that body 44.

Under normal operating conditions, the valve element 30 operates as a yieldable partition which separates the two ports 28. The valve element 30 is yieldingly maintained in its normal position by a regulator 66. This regulator includes a short stem 68 which is slidably fitted in a bore 70 in the body 12 and intersecting the bore 24 at equal distances from the ports 28. This stem is provided with a tapered end 72 which is normally pressed into a V-shaped groove 74 in the valve element 30 and extending circumferentially thereabout. The groove 74 is of the same angle as the end 72.

The stem 68 comprises a continuation of an annular body 76 slidably mounted in a bore 78 in the body 12. A plug 80 is threaded into the bore 78 and has a tapered recess 82 for the reception of one end of a compression spring 84. This recess performs a centering function with respect to the spring. The other end of the spring lies in an axial bore 86 in the body 76.

The bore 86 terminates in a venting port 90' which has communication with the bore 70. A port 90 is provided in the plug 80 to place the bore 78 in communication with the chamber 14. This plug is provided with a screw driver slot 92.

Gaskets 94 are interposed between the nut flanges 96 and the ends of the respective extensions 26' to provide leakproof connections.

While the present invention operates efficiently as a shutoff valve in hydraulic brake systems, the device operates equally well in any type of installation where fluid pressure lines are connected with a common source of supply and in which impairment of one branch causes impairment of the entire system. In a brake installation, the brake lines are connected with the nuts 32 and the nut 20 is connected with the master cylinder. In such cases, the valve element 30 remains in its normal position under normal operating conditions. Should a break occur in one of the brake lines, the unbalanced pressure condition in the bore 24 would cause the valve element 30 to shift in this bore in the direction of the low pressure side to close the port 28 on the impaired side of the shutoff valve to prevent loss of fluid and to maintain the other side of the system in an operating condition.

The valve element 30 is of cylindrical contour and its annular faces 62 provide large sealing areas, which function as sealing lands beyond that area of the bore 24 into which the regulator 66 projects. Any longitudinal movement of the valve element 30 is yieldingly resisted by the regulator.

A valve element of the cylindrical type shown embodies certain advantages over valve elements of the ball type. Efficiency is increased in a degree that makes the valve element respond to variations in pressure heretofore disregarded in the equal distribution of hydraulic pressure due to their extremely short periods of duration. During these brief periods of time, the difference in pressure varies according to the position of the brake shoes to their respective brake drums and the resistance encountered in this travel. This resistance is due to the slight difference in spring tension, rust, corrosion and the brake shoe tension while aligning itself to the brake drum. Another cause of slight pressure difference is due to the different sizes of brake shoes on the same vehicle, requiring brake cylinders of different sizes which in turn require different volumes of fluid and retracting springs of different tensions, resulting in a temporary unequal distribution of pressure. The foregoing conditions make it necessary to provide some means to prevent the valve element from moving into the low pressure side during the short periods of unbalanced pressure. Thus the valve element 30 is subjected to an unstable condition under normal operation. Since the inequalities of pressure are not caused by the loss of fluid and are of short duration, a time period, in which the valve element is free to move is necessary. This is accomplished by the regulator 66 in its coaction with the valve element 30, which permits the fluid under pressure to equalize itself and overcome the resistance of back pressure caused by external mechanical conditions foreign to the fluid assembly.

The tapered end 72 fits in the V-shaped groove 74, and the regulator 66 is arranged to move at right angles to the axis of the bore 24. The tapered end is spring tensioned against the valve element 30, which tends to force the regulator to a point of contact with the valve element nearest the smallest diameter of the groove in that element. It is this action that helps provide a time period which is established by the tension of the spring 84 and the distance from the point of contact in the groove 74 at its smallest diameter to the largest diameter of the valve element. While the valve element to free to move through this distance under the control of the regulator, the resulting time period of very short duration, permits the fluid under pressure on the low side to equalize itself with that on the high pressure side during the unstable periods.

The valve element 30 is movable in either direction for selective engagement with the seats 64 depending upon the side on which a low pressure condition takes place. Upon movement of the valve element a predetermined distance, one of the faces 62 seals the port 28 on the low pressure side of the valve. A complete seal is attained upon engagement of the tapered end of the valve element with the resilient body 44 on that side of the valve. The diffusing bores 26 perform a useful function in that a low pressure area, caused by a pressure drop in one of the ports 28 cannot effect pressure in the chamber 14 until it has been diffused in the bores 26, so that a drop in pressure does not immediately affect the unbroken side of the system.

The tapered end face 72 rides on the correspondingly angled faces of the groove 74. When the end 72 remains in the groove 74, the valve element 30 is free to move the distance from the smallest diameter to the greatest diameter, during which period the valve element is under control of the regulator 66. The yielding resistance of the regulator with respect to displacement of the valve element 30 takes care of the unstable conditions wherein the valve element would otherwise fluctuate in some degree.

In a construction such as that shown in Figure 1, the valve element 30 partially closes either port 28 before the end 72 is lifted onto either of the faces 62. The valve element 30 is free to oscillate, under control of the regulator during temporary or unbalanced periods, as long as the point 72 remains in the groove 74.

Figure 2:
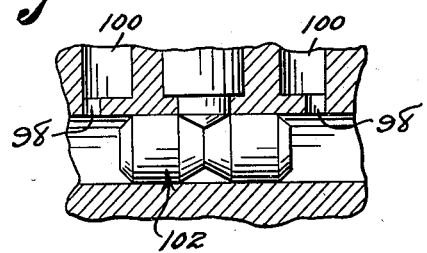
Figure 2 is a view illustrating a modification wherein a valve element is characterized by a large range of movement during its unbalanced conditions.
Figure 3:
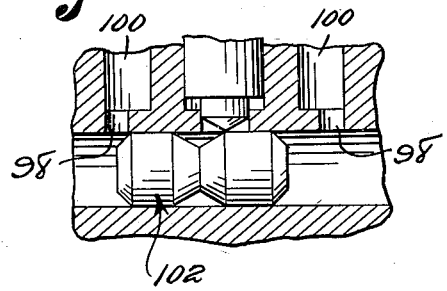
Figure 3 is a sectional view illustrating a shifted position of the valve element of Figure 2.

The ports 28 may be placed in different positions to change the port covering action of the valve element 30. In Figures 2 and 3, the ports 98 are associated with bores 100 corresponding to the bores 26. The only difference resides in the fact that the ports 98 are spaced farther apart than is true in Figure 1, so that it will be necessary for the valve element 102 to move distances greater than in an arrangement according to Figure 1 wherein the ports 28 are arranged coaxially with their respective bores 26.

Figure 4:
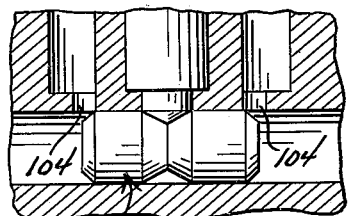
Figure 4 is a sectional view of another modification illustrating a valve element characterized by slight movement during its unstable conditions for obstructing the low pressure circuit upon slight movement of the valve element.
Figure 5:
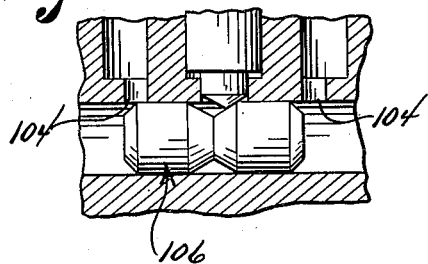
Figure 5 is a view illustrating a shifted position of the valve element of Figure 4.

In Figures 4 and 5, the ports 104 are reversely arranged with respect to the illustrations of Figures 2 and 3, so that the ports are immediately covered in various degrees upon unstable oscillation of the valve element 106. The only difference in the three forms shown resides in the different distances which the valve element must move in order to initiate partial or complete closing of the port on the side to which the valve element is moved.

Without further elaboration, the foregoing will so fully explain my invention, that others may, by applying current knowledge, readily adapt the same for use under various conditions of service.

I claim:

1. In a fluid pressure system wherein branch circuits are connected with a common source of fluid pressure, a valve comprising a body having an inlet for connection with said common source and outlets for connection with the branch circuits, said body having an inlet chamber and a bore communicating with both outlets, said body having ports placing said chamber in communication with said bore, a valve element slidable in said bore and normally positioned between said ports, said valve element having a V-shaped groove, a resiliently biased regulator in and acted upon by source of fluid supply and provided with a tapered end engaging in said groove to yieldingly resist movement of said valve element within predetermined limits, and seats respectively engageable by said valve element when the latter is shifted beyond the restraining limits of said regulator in response to an unbalanced pressure condition in said bore for cutting off communication between the low pressure circuit and said chamber.

2. In a fluid pressure system wherein branch circuits are connected with a common source of fluid pressure, a valve comprising a body having an inlet for connection with said common source and outlets for connection with the branch circuits, said body having an inlet chamber and a bore communicating with both outlets, said body having ports placing said chamber in communication with said bore, a cylindrical valve element slidable in said bore and normally positioned between said ports, said valve element having a V-shaped groove extending circumferentially thereabout, a spring pressed regulator in and acted upon by the source of fluid supply and provided with a tapered end normally engaging the walls of said groove to yieldingly resist movement of said valve element within predetermined unbalanced pressure conditions in said bore, and seats respectively engageable by said valve element when the latter is shifted beyond the restraining limits of said regulator in response to unbalanced pressure conditions in said bore for cutting off communication between the low pressure circuit and said chamber.

3. The invention described in claim 1 wherein said valve element is shaped to close said ports when moved into seating engagement with said seats but to partially close the ports when shifted predetermined distances short of seat engagement.

4. The invention described in claim 2 wherein said valve element is shaped to close said ports when moved into seating engagement with said seats but to partially close the ports when shifted predetermined distances short of seat engagement.

5. The invention described in claim 1 wherein said regulator includes a spring pressed pin slidably guided at right angles to the axis of said bore.

6. The invention described in claim 2 wherein said body is provided with a guiding bore for the regulator arranged at right angles to the axis of said bore.

7. The invention described in claim 1 wherein said ports each includes a large diameter bore opening into said chamber and a smaller diameter bore leading into said first mentioned bore.

8. The invention described in claim 2 wherein each of said ports comprises a large diameter bore opening into said chamber and a smaller diameter bore opening into said first mentioned bore.

9. The invention described in claim 1 wherein said regulator is provided with an opening communicating with said chamber and adapted to bleed into said bore.

10. The invention described in claim 2 wherein said regulator is provided with a bleeding opening communicating with said chamber and said bore.

11. The invention described in claim 1 wherein said seats respectively comprise resilient bodies having preliminary seals engageable with said valve element.

12. The invention described in claim 2 wherein said seats respectively comprise resilient bodies having cavities for the reception of the ends of said valve element and provided with preliminary sealing formations engageable with the valve element before the latter is brought into engagement with the respective seats.

13. The invention described in claim 2 wherein said body is provided with couplings for the branch circuits, said couplings being threaded into said body and provided with means for fixedly securing said seats.

RUDOLPH H. BLANK.